United States Patent [19]
Haynes, Jr.

[11] Patent Number: 5,163,414
[45] Date of Patent: Nov. 17, 1992

[54] BARBEQUE GRILL WITH FOLDABLE LEGS

[75] Inventor: James P. Haynes, Jr., Chuckey, Tenn.

[73] Assignee: Meco Corporation, Greeneville, Tenn.

[21] Appl. No.: 801,227

[22] Filed: Dec. 3, 1991

[51] Int. Cl.⁵ .......................... A47J 37/00; F24B 3/00
[52] U.S. Cl. .................. 126/25 R; 126/9 R; 126/305; 108/119
[58] Field of Search .............. 126/25 R, 25 A, 29, 126/30, 9 R, 9 A, 41 R, 305, 306, 304 R, 304 A; 248/432, 164, 221.4; 108/119

[56] References Cited
U.S. PATENT DOCUMENTS

| | | | |
|---|---|---|---|
| 2,003,974 | 6/1935 | Pearson | 126/25 R |
| 2,053,577 | 9/1936 | Pearson | 126/25 R |
| 2,488,014 | 11/1949 | Higman | 126/25 R |
| 2,871,075 | 1/1959 | Stone | 108/119 |
| 3,139,845 | 7/1964 | Kolinski | 108/119 |
| 3,556,076 | 1/1971 | Stewart | 126/25 R |

Primary Examiner—James C. Yeung
Attorney, Agent, or Firm—David H. Semmes

[57] ABSTRACT

Barbecue grills, particularly a portable barbecue grill with a snap-in cooking grill and pairs of intersecting and foldable supporting legs. The barbecue grill may be disassembled by folding the legs against the cooking bowl and without the cooking grill falling out of the cooking bowl.

1 Claim, 5 Drawing Sheets

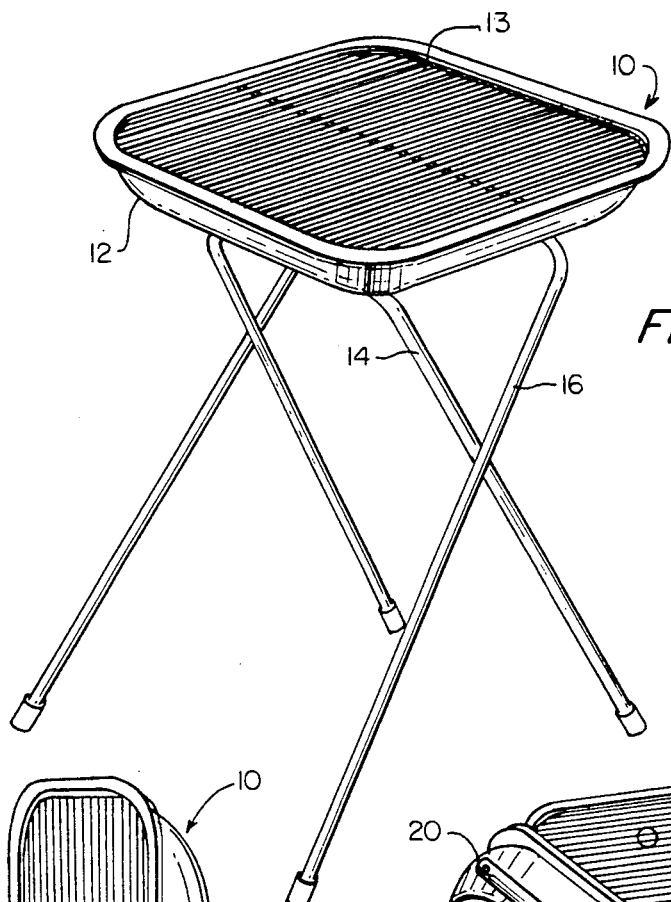
FIG. 1
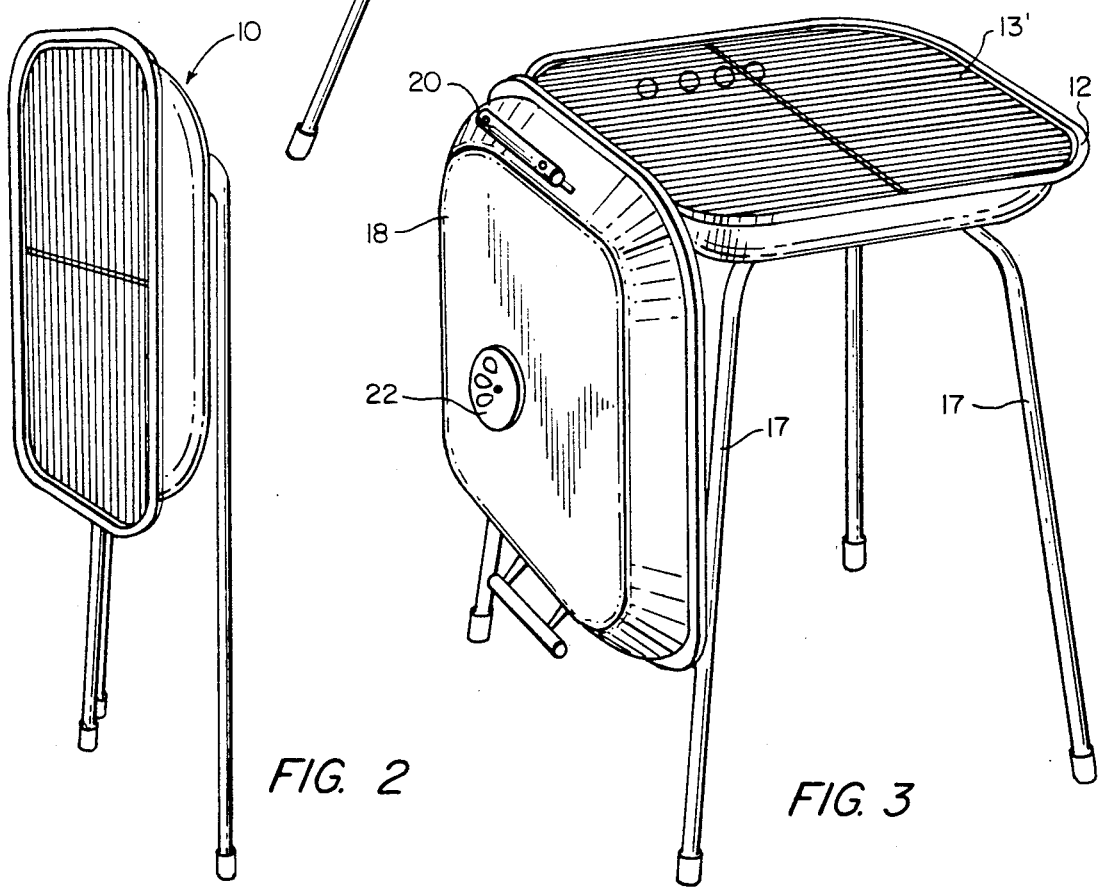
FIG. 2
FIG. 3

BARBEQUE GRILL WITH FOLDABLE LEGS

BACKGROUND OF THE INVENTION

1. Field of the Invention

Barbecue grills, particularly a barbecue grill with foldable legs and a snap-in cooking grill. The combination of foldable legs and snap-in grill enables carrying and storage of the grill with legs folded against the cooking or fire bowl and without the cooking grill falling out of the cooking bowl.

2. Description of the Prior Art

| | |
|---|---|
| KAMIN | 4,261,327 |
| CHAN | 4,542,733 |
| SARGUNAM | 4,593,677 |
| KLINERT | 1,540,077 |
| FRANK | 3,147,748 |
| GOLDSTEIN | 3,200,806 |
| MARSHALL | 3,610,224 |
| CHING SHY | 4,063,703 |
| LANDRY | 4,069,806 |

SUMMARY OF THE INVENTION

According to the present invention, a portable barbecue grill includes a rounded fire bowl, a cooking grill removably supported within the fire bowl top and pairs of inverted U-shaped foldable legs. The first or outer pair of legs is pivotably connected at its top to the bottom of the fire bowl with its free leg ends depending. The second or inner pair of legs is pivoted at its shank portion to the shank portion of the pair of outer legs. A leg clip affixed to the bottom surface of the fire bowl resiliantly engages the pair of inner legs at its top so as to releaseably secure the inner pair of legs to the fire bowl bottom with the shank portions of the outer and inner legs intersecting beneath the fire bowl.

DESCRIPTION OF THE DRAWINGS

FIG. 1 is a perspective view of the portable cooking grill with the pair of inner legs releasably secured to the bottom of the fire bowl.

FIG. 2 is a side elevation of the cooking bowl with the foldable legs folded in parallel against the bottom of the fire bowl for carrying or storage by hanging on a peg or the like.

FIG. 3 is a perspective view of a modification of invention with a removable top.

DESCRIPTION OF THE PREFERRED EMBODIMENTS

Figure 4:
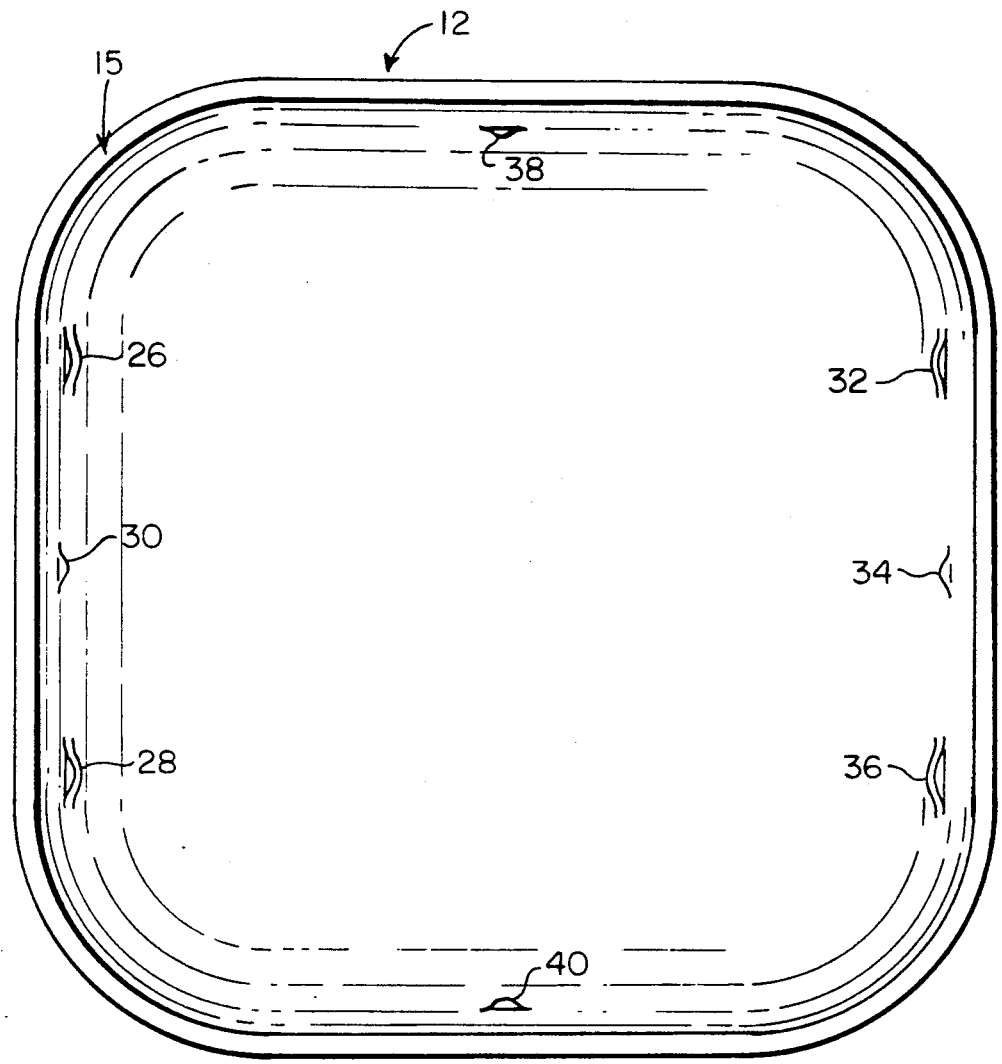
FIG. 4 is a top plan of the fire bowl.
Figure 5:
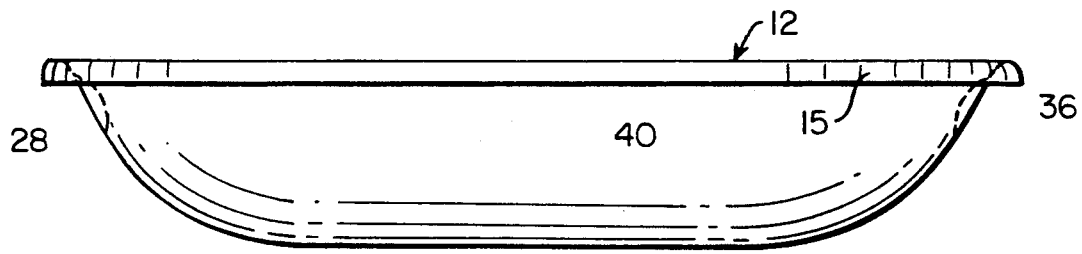
FIG. 5 is a side elevation of the fire bowl.
Figure 6:
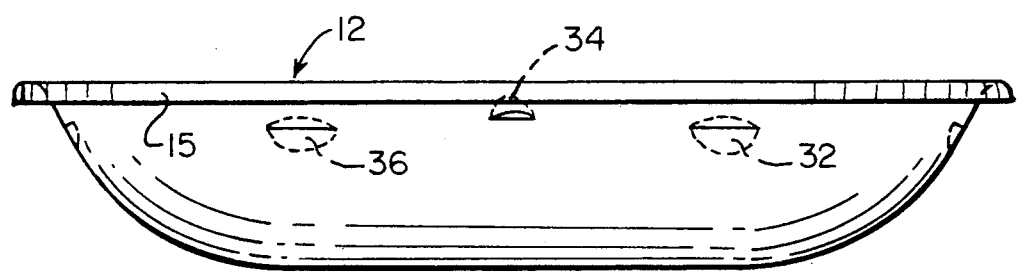
FIG. 6 is an end elevation of the fire bowl showing the upper and lower dimples for snap fitting of the cooking grill.

In FIG. 1 portable grill 10 is illustrated as including rounded fire bowl 12, cooking grill 13, outer pair of inverted U-shaped legs 16 and inner pair of inverted U-shaped legs 14.

In FIG. 2 pairs of legs 14, 16 are illustrated as folded in parallel with the bottom of rounded fire bowl 12 for portability or storage.

A modified version is illustrated in FIG. 3 embodying a removable cover 18 having insulated carrying handle 20, cover vent 22, removable grill 13 and rigid legs 17.

In FIG. 4, fire bowl 12 is illustrated as including upper outwardly extending flange 15, together with pairs of lower dimples 26, 28 and 32, 36. Upper dimples 30, 34 are superposed with respect to pairs of lower dimples 26, 28 and 32, 36 respectively. Also, upper dimples 38, 40 are provided on opposed sides such that cooking grill 13 may be snap fitted into the fire bowl assembly.

Figure 7:
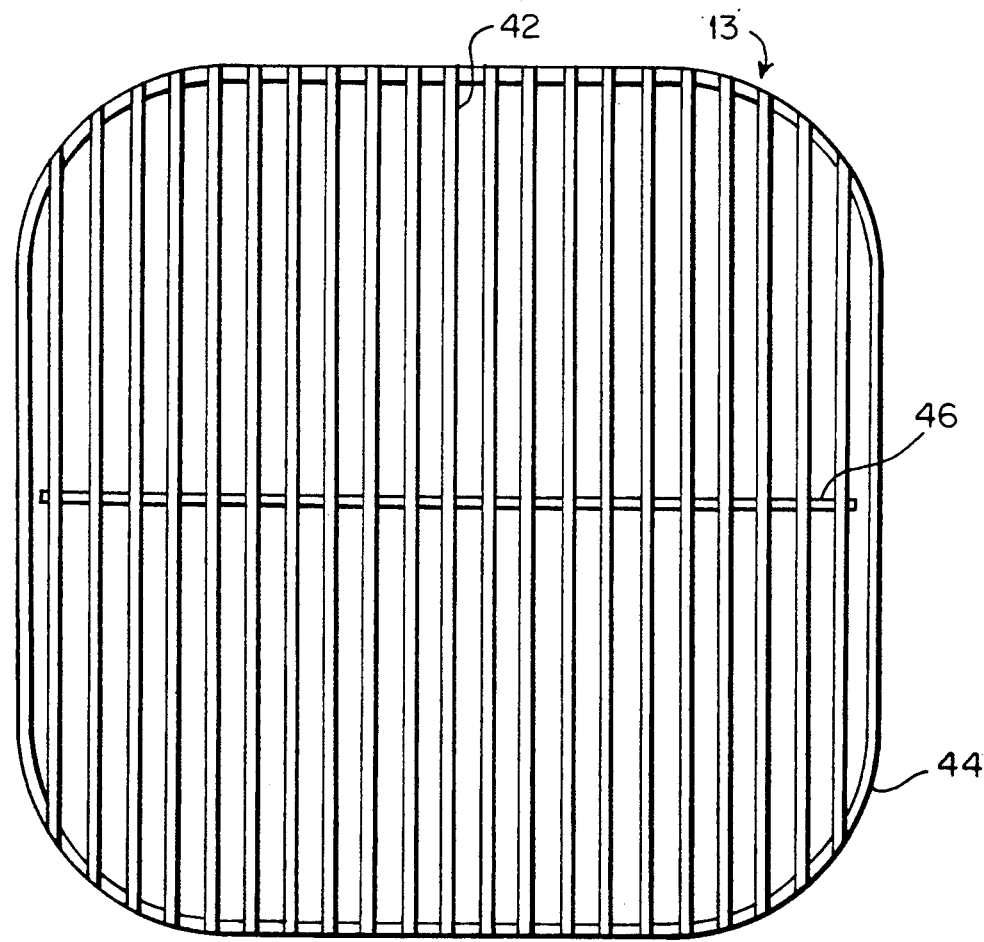
FIG. 7 is a top plan of the cooking grill.

Cooking grill 13 is illustrated in FIG. 7 as including peripheral member 44, a plurality of smaller rods 42 butt welded at their ends to perimeter 44 and peripheral portion transverse support rod 46. Cooking grill 13 is snap fitted into fire bowl 12 such that the grill lower portion is supported upon lower dimples 26, 28 and 32, 34 while the upper portion of peripheral portion 44 is snap fitted beneath the upper dimples 30, 38 and 40.

Figure 8:
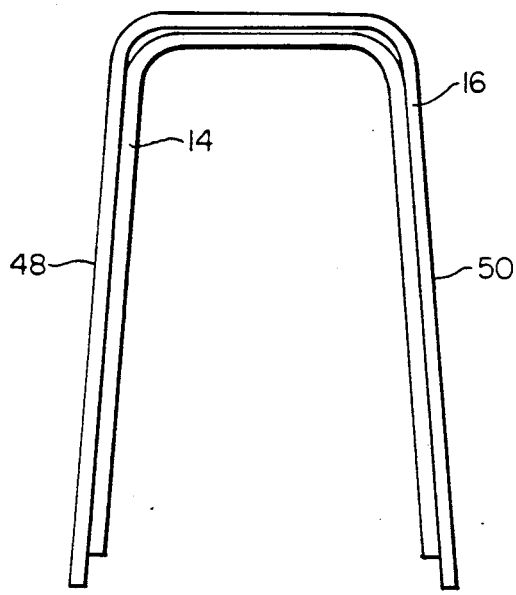
FIG. 8 is a front elevation of the pairs of inner and outer inverted U-shaped legs.

In FIG. 8, the pairs of inverted U-shaped outer legs 16 and inner legs 14 are shown as pivoted at their shank portions by means of pins 48, 50.

Figure 9:
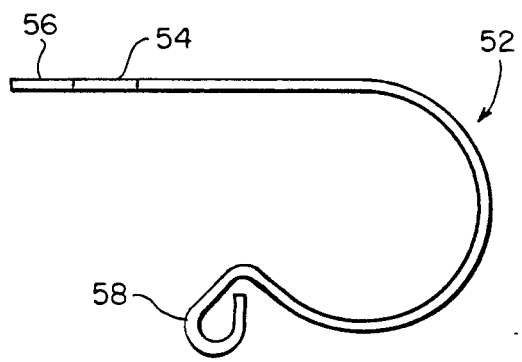
FIG. 9 is an enlarged side elevation of a resilient clip secured to the bottom of the fire bowl for engaging the top portion of the inner legs.

In FIG. 9 resilient clip 52 is illustrated as including top portion 56 are secured to the bottom of fire bowl 10 by means of hole 54 and conventional stove bolt or the like extending through hole 54 into the bottom of fire bowl 10 and closed on the bottom outside of fire bowl 16 by means of a lock nut or the like. A resilient free end 58 is curled upon itself and engages the top portion of the pair of inner legs 14, so as to releasably secure the top of the pair of inner legs apart from the top of outer legs 16.

Figure 10:
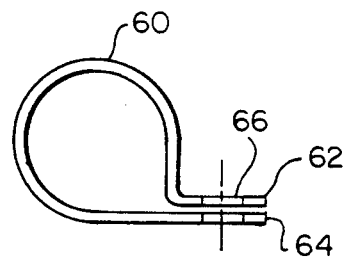
FIG. 10 is a side elevation of one of the clamps used for pivotably securing the top of the pair of outer legs to the bottom of the fire bowl.

In FIG. 10, pivoting clip 60 is illustrated as including flat portion 62 secured to the bottom of the fire bowl by means of bolts extending through aligned holes 66, 64 and locked by conventional lock nut on the bottom outside of fire bowl 10. One or more clips 60 may be secured to the bottom of fire bowl 10, such that the top of the outer pair of legs 16 is pivotably secured and that the pairs of legs 14, 16 may be pivoted from the intersecting and supporting position illustrated in FIG. 1 to the folded storage or portability position illustrated in FIG. 2.

Manifestly, folding legs 14, 16 provide for easy portability and storage, while snap-in grill 13 is locked between the upper and lower dimples. In one prototype, 380 square inches of cooking area are provided, while top of the inner pair of legs 14 is resiliently snapped into clip 52. This snap-in of inner legs 14 provides a rigid support, yet integrated disassembly to the parallel position shown in FIG. 2 for carrying and storage. The simplicity of the device is in contrast to a sophisticated cooking capability, and easy portability in storage.

Figure 11:
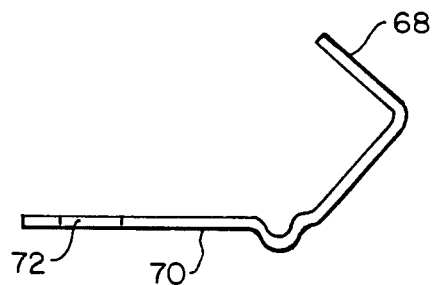
FIG. 11 is a side elevation of a hanger bracket which may be secured to the side of the cooking bowl for hanging of the removable cover on the modified bowl peripheral flange, as illustrated in FIG. 3.
Figure 12:
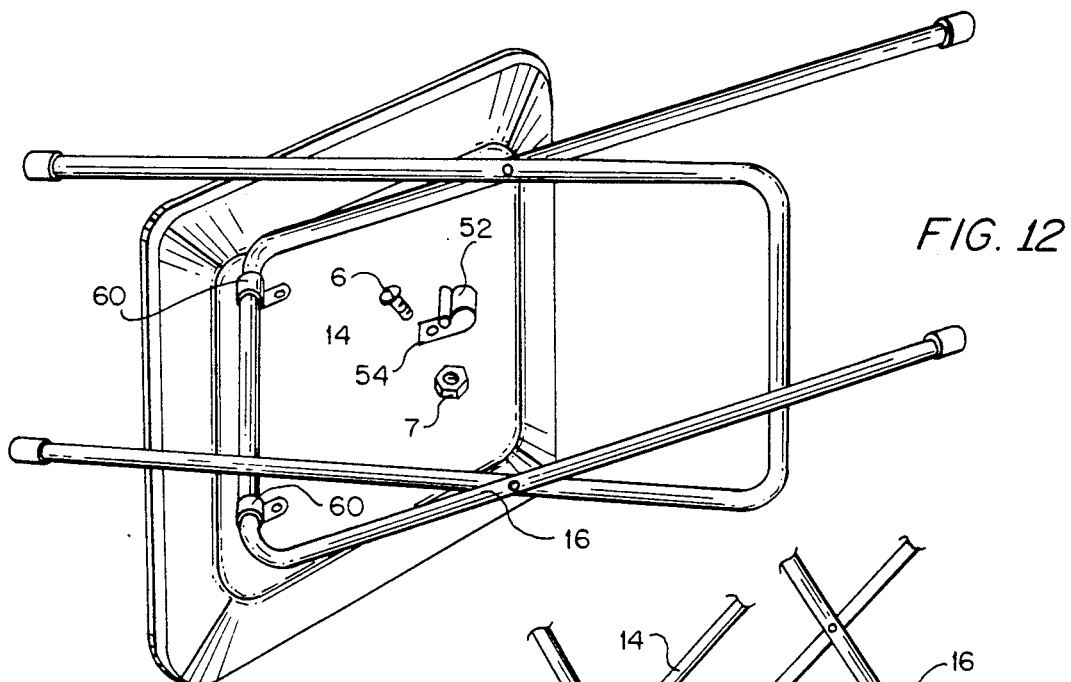
FIG. 12 is an inverted perspective, showing pairs of legs 14, 16 prior to securement of legs 16 U-shaped in resilient clip 52.
Figure 13:
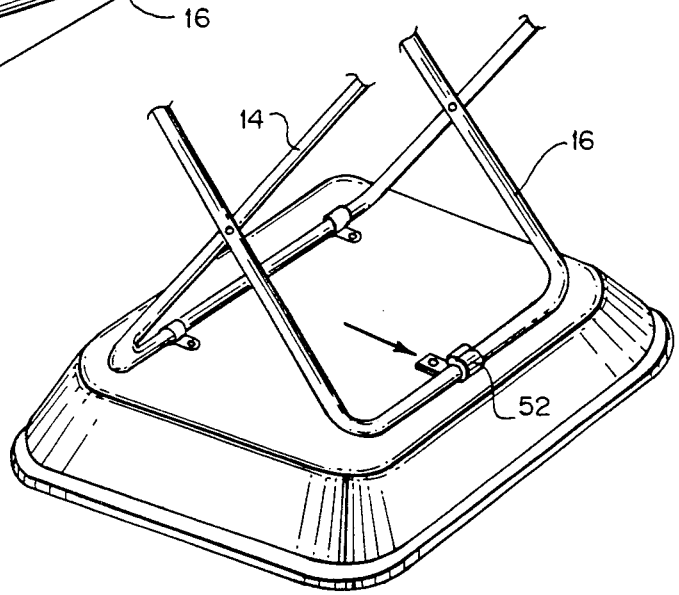
FIG. 13 is an inverted perspective, showing legs 16 U-shaped portion secured in clip 52.
Figure 14:
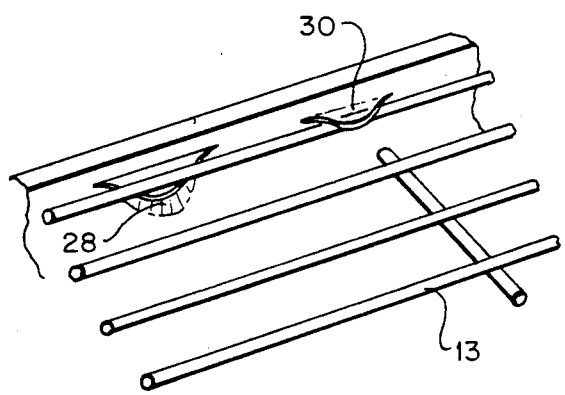
FIG. 14 is an enlarged fragmentary perspective, showing snap-fitting of grill 13 between lower dimple 28 and upper dimple 30.

FIG. 11 depicts hanger bracket 68 which may be secured to the fire bowl side by means of conventional bolt and lock nut (not illustrated), extending through hole 17 defined in flat portion 70.

Manifestly, the snap-in feature and folding of the legs may be varied without departing from the spirit and scope of the invention.

I claim:

1. A portable barbecue grill with foldable legs comprising:
   a. a fire bowl having a rounded body portion with a top peripheral flange defining an open top including the combination of:
      i. a plurality of pairs of inwardly protruding lower dimples defined in the inner sides of said fire bowl, so as to support a cooking grill, and
      ii. a plurality of inwardly protruding upper locking dimples defined in the inner side of said fire bowl and superimposed with respect to said pairs of lower dimples, so as to releasably engage a cooking grill;
   b. a cooking grill removably supported by snap-fitting within said fire bowl top combination of pairs of lower dimples and upper locking dimples;
   c. pairs of inverted U-shaped foldable legs further including:
      i. an outer pair of legs joined pivotably connected to the bottom of said fire bowl with the leg free ends depending;
      ii. an inner pair of legs pivoted at its shank portion to the shank portion of said outer pair of legs with its free leg ends depending;
      iii. a leg clip affixed to the bottom surface of said fire bowl apart from the top of said outer pair of legs, so as to resiliently engage the top pair of inner legs and thereby secure the top portion of said pair of inner legs to said fire bowl with the shank portions of said outer and inner pairs of legs intersecting beneath said fire bowl, as the free ends engage a supporting surface;

said inner pair of legs being releasable from said leg clip and foldable to a position of parallel abutment with respect to said outer legs, such that said pairs of legs abut the bottom of said fire bowl in carry mode.

* * * * *